United States Patent
Kume

Patent Number: 4,765,191
Date of Patent: Aug. 23, 1988

[54] TORQUE DETECTOR

[76] Inventor: Takeshi Kume, 2-1, 3-chome, Tsukaguchihonmachi, Amagasaki 660, Japan

[21] Appl. No.: 13,947

[22] Filed: Feb. 12, 1987

[30] Foreign Application Priority Data

Apr. 11, 1986 [JP] Japan .................. 61-084689

[51] Int. Cl.$^4$ .............................................. G01L 3/14
[52] U.S. Cl. .................. 73/862.19; 73/862.31
[58] Field of Search ............ 73/862.19, 862.31, 862.49

[56] References Cited

U.S. PATENT DOCUMENTS

| | | | |
|---|---|---|---|
| 2,582,784 | 1/1952 | Lumb et al. ............. | 73/862.19 |
| 2,783,645 | 3/1957 | Hornbostel ............. | 73/862.31 |
| 3,946,603 | 3/1976 | Houvouras . | |
| 4,435,988 | 3/1984 | Corry et al. ............. | 73/862.31 X |

FOREIGN PATENT DOCUMENTS

| | | |
|---|---|---|
| 892665 | 5/1944 | France . |
| 1462481 | 12/1966 | France . |
| 1493493 | 9/1967 | France . |
| 427243 | 9/1948 | Italy .................. 73/862.19 |
| 1144602 | 3/1969 | United Kingdom . |

*Primary Examiner*—Charles A. Ruehl
*Attorney, Agent, or Firm*—Marshall, O'Toole, Gerstein, Murray & Bicknell

[57] ABSTRACT

A torque detector comprising a first shaft and a second shaft, which are journalled in axially aligned and fixed relation with each other. A movable shaft is interposed between and axially aligned with the first and second shafts, the movable shaft being in axially slidable engagement with the first shaft and rotatable with the first shaft. The movable shaft is in rotatable threaded engagement with the second shaft, and springs are interposed between the movable and second shafts to resist and limit the axial movement and rotation of the removable shaft relative to said second shaft, whereby said axial movement depends on the torque being transmitted between the first and second shafts, when one of the first and second shafts is driven. The movable shaft is adapted to be connected to a transducer for determining the axial movement.

5 Claims, 1 Drawing Sheet

U.S. Patent     Aug. 23, 1988     4,765,191
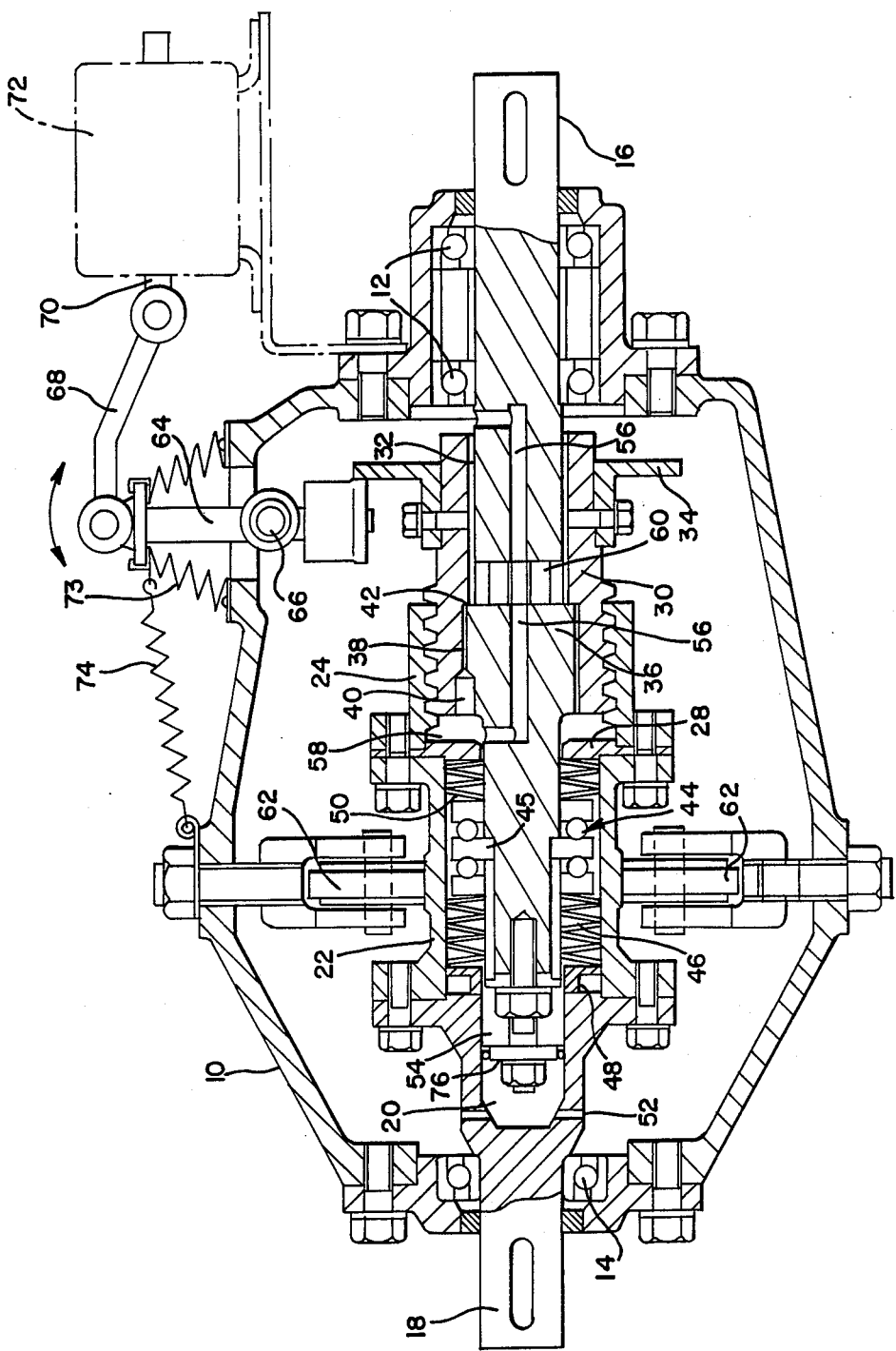

TORQUE DETECTOR

FIELD AND BACKGROUND OF THE INVENTION

The present invention relates to a torque detector for use on a power transmission shaft, i.e. for use in power transmission from a drive shaft to a driven shaft of a machine such as an automobile.

The torque acting on such a transmission shaft changes as the load on the driven shaft fluctuates. Generally, it is possible to maintain the rotational speed of a machine at a selected value, or to obtain a desired speed, by changing the power output of the drive shaft in accordance with the fluctuating torque. A known torque detector determines the torque fluctuations by detecting speed changes of the machine, and adjusts the power output of the drive shaft in accordance with the detected change in torque.

Power transmission systems normally also include a gear reduction mechanism. Although the above known torque detector is effective when the reduction gear ratio is fixed, if the ratio is changeable, it is necessary to set a different reference speed for a desired torque every time the ratio is changed. Such a detector cannot function adequately in a machine having a stepless speed change gear mechanism, for example.

It is a general object of the present invention to provide a torque detector having a relatively simple construction, for detecting the torque acting on a power transmission shaft.

SUMMARY OF THE INVENTION

A torque detector according to the invention is designed for use with a first shaft and a second shaft, which are journaled in axially aligned and in axially fixed relation with each other. The detector includes a movable shaft which is interposed between and axially aligned with the first and second shafts. The movable shaft is in axially slidable engagement with the first shaft and is rotatable with the first shaft, and it is in rotatable threaded engagement with the second shaft. Spring means is interposed between the movable and second shafts to resist and limit the axial movement and rotation of the movable shaft relative to the second shaft, so that the axial movement depends on the torque being transmitted between the first and second shafts, when one of the first and second shafts is driven. The movable shaft is adapted to be connected to means for detecting the axial movement of the movable shaft.

BRIEF DESCRIPTION OF THE DRAWINGS

A preferred embodiment of the invention is shown in the accompanying single FIGURE of the drawing, which shows a torque detector in axial cross section.

DETAILED DESCRIPTION OF THE DRAWINGS

The illustrated detector includes a housing or casing 10 having angular-contact bearings 12 and 14 at both ends, which journal a drive shaft 16 and a driven shaft 18, respectively. The shafts 16 and 18 are axially aligned and axially fixed relative to the casing 10, and the bearings 12 and 14 support both radial and axial loads.

The driven shaft 18 has a bore 20 adjacent the inner end (the right-hand end as seen in the drawing). An intermediate sleeve 22 is bolted at one end to the inner open end of the driven shaft 18, and at its other end the sleeve 22 is bolted to one end of a sleeve 24 having multiple internal threads. Fixed between the adjacent ends of the sleeves 22 and 24 is a stop ring 28 which extends radially inwardly.

Threaded smoothly within the sleeve 24 is a movable sleeve 30 which has external threads on one end portion. The other end portion of the movable sleeve 30 extends in axially slidable relation around the inner end portion (the left-hand end) of the drive shaft 16 and they are connected by axial splines 32. Bolted to the outer periphery of the sleeve 30 is an annular L-shaped flange 34.

Coupled to the inner periphery of the movable sleeve 30, at its end which is adjacent the driven shaft 18, is an axial extension or stub shaft 36. The parts 30 and 36 are prevented from movement circumferentially by splines 38 and axially by a set screw 40 and an annular step 42 in the sleeve 30. The extension 36 extends toward the driven shaft 18 through the ring 28 and the sleeve 22 and into the bore 20.

Fixed to the outer periphery of the extension 36 is the center race 45 of a thrust bearing 44. One set of Belleville springs 46 is interposed around the extension 36 between an outer race of the bearing 44 and an annular member 48, which engages slidably with the endmost of the springs 46, and the member 48 also engages with the inner end of the driven shaft 18. Another set of Belleville springs 50 is likewise interposed between another outer race of the bearing 44 and the flange 28.

The driven shaft 18 is formed with orifices 52 which vent the space 54 formed by the bore 20, intermediate sleeve 22, extension 36 and flange 28. The drive shaft 16 and the extension 36 are formed with passages 56 which vent the space 58 formed by the extension 36, sleeves 30, 24 and flange 28, and a space 60 formed by the drive shaft 16, extension 36 and sleeve 30.

The outer casing 10 supports rollers 62 therewithin which engage and rotatably support the intermediate sleeve 22. The casing 10 also supports a pivotable lever 64 by means of a pin 66 which is fixed to the casing 10 and extends perpendicularly to the axes of the shafts 16 and 18. The lower end of the lever 64 is engaged by the flange 34, and the upper end is connected through rods 68 and 70 to a transducer such as a differential transformer 72, or other means for converting mechanical movement into electric signals. A tubular bellows 73 surrounds the upper end of the lever 64, and a tension spring 74 biases the lever 64 in the counterclockwise direction on the pin 64 and holds it against the flange 34.

In operation, the drive shaft 16 rotates the movable sleeve 30 through the splines 32, which tends to further thread the sleeve 30 into the threaded sleeve 24, thereby thrusting the extension 36 toward the left and away from the drive shaft 16 and against the compression of the springs 46.

If the load on the driven shaft 18 side rapidly increases, the torque being transmitted also increases, and the previously existing balance between the thrust of the extension 36 and the retaining strength (force) of the springs 46 is lost, so that the movable sleeve 30 is further threaded into the sleeve 24 until the forces are again balanced. This moves the flange 34 an axial distance depending on the additional compressive force created by the increased torque which is acting on the transmission path between the drive and driven shafts 16 and 18.

If the load rapidly decreases, the flange 34 moves in the opposite direction (toward the right).

The movement of the flange 34 is converted into an electric signal by the transducer 72. The signal may be used, for example, for display means (not shown), or as a control signal to change the power output of the drive shaft 16 so as to control the rotational speed of the driven shaft 18.

When the load rapidly fluctuates, the rapid changes in axial movement of the parts is decelerated or damped by the spring effect of the Belleville springs 46 and 50, and by the resistance of the air flowing through the passages 52 and 56 as the spaces 54, 58 and 60 change their volumes. A mechanism 76 is fastened to the left end of the extension 36 and slides within the bore 20, and thus guides the axial movement of the extension 36.

The use of the Belleville springs to resist the axial movement due to the torque acting on the parts allows the detector to be compact in volume relative to the amount of the spring force and the torque being transmitted. The springs also absorb shocks due to rotation of the parts.

Thus, the detector is connected directly in the power transmission path, and can therefore be used to detect the torque of the output shaft of a stepless speed change gear, where the reduction gear ratio varies. Consequently, the detector can be used with an automatic speed change apparatus having a stepless speed change gear.

Because the detector can detect a large amount of torque, it can be used with an automobile, a large machine tool or the like.

I claim:

1. A torque detector for use in a power transmission system, comprising a first shaft and a second shaft, which are journalled in axially aligned and fixed relation with each other, a movable shaft interposed between and axially aligned with said first and second shafts, said movable shaft being in axially slidable engagement with said first shaft and rotatable with said first shaft, said movable shaft being in rotatable threaded engagement with said second shaft, and first and second spring means interposed between said movable and second shafts to resist and limit the axial movement and rotation of said movable shaft relative to said second shaft, said first spring means urging said movable shaft in one axial direction relative to said second shaft, and said second spring means urging said movable shaft in the opposite axial direction relative to said second shaft, whereby said axial movement in either axial direction depends on the torque being transmitted between said first and second shafts, when one of said first and second shafts is driven, said movable shaft being adapted to be connected to means for determining said axial movement.

2. A torque detector for use in a power transmission system, including a first shaft and a second shaft which are journalled in axially aligned and fixed relation with each other, said detector comprising a movable shaft adapted to be interposed between and axially aligned with said first and second shafts, said movable shaft being adapted to be in axially slidable engagement with said first shaft and rotatable with said first shaft, said movable shaft being adapted to be in rotatable threaded engagement with said second shaft, first and second spring means adapted to be interposed between said movable and second shafts to resist and limit the axial movement and rotation of said movable shaft relative to said second shaft, said first spring means urging said movable shaft in one axial direction relative to said second shaft, and said second spring means urging said movable shaft in the opposite axial direction relative to said second shaft, whereby said axial movement in either axial direction is representative of the torque being transmitted between said first and second shafts.

3. A torque detector according to claim 2, and further including a transducer connected to said movable shaft and responsive to axial movement of said movable shaft.

4. A torque detector according to claim 2, wherein said first and second spring means comprises Belleville springs.

5. A torque transducer according to claim 4, wherein said first and second spring means are positioned around said movable shaft and within an opening in said second shaft.

* * * * *